(12) United States Patent
Kauhaniemi et al.

(10) Patent No.: US 7,885,695 B2
(45) Date of Patent: Feb. 8, 2011

(54) ELECTRONIC DEVICE WITH OVERLAPPING SLEDGE PORTION

(75) Inventors: Ilpo Kauhaniemi, Vantaa (FI); Antti Ronkko, Espoo (FI); Antti Salo, Beijing (CN); Markus Kettunen, Halikko (FI)

(73) Assignee: Nokia Corporation, Espoo (FI)

( * ) Notice: Subject to any disclaimer, the term of this patent is extended or adjusted under 35 U.S.C. 154(b) by 575 days.

(21) Appl. No.: 11/793,446

(22) PCT Filed: Dec. 20, 2004

(86) PCT No.: PCT/FI2004/000782
§ 371 (c)(1),
(2), (4) Date: Jan. 22, 2008

(87) PCT Pub. No.: WO2006/067259
PCT Pub. Date: Jun. 29, 2006

(65) Prior Publication Data
US 2008/0139260 A1 Jun. 12, 2008

(51) Int. Cl.
*H04M 1/00* (2006.01)
(52) U.S. Cl. .............. 455/575.4; 379/433.12; 361/727
(58) Field of Classification Search .......... 455/575.4, 455/550.1; 379/433.12, 428.01; 361/727, 361/679.05; D14/138
See application file for complete search history.

(56) References Cited

U.S. PATENT DOCUMENTS

| | | | |
|---|---|---|---|
| 5,335,274 A | 8/1994 | Masuda et al. | |
| 6,822,871 B2 | 11/2004 | Lee et al. | |
| 7,269,451 B2* | 9/2007 | Kwon | 455/575.4 |
| 7,319,892 B2* | 1/2008 | Kato | 455/575.4 |
| 7,469,156 B2* | 12/2008 | Kota et al. | 455/575.4 |
| 2002/0137476 A1 | 9/2002 | Shin | |
| 2004/0157653 A1* | 8/2004 | Kato | 455/575.4 |
| 2004/0198246 A1* | 10/2004 | Tsai | 455/90.1 |
| 2005/0095995 A1* | 5/2005 | Bae | 455/90.3 |
| 2005/0113154 A1* | 5/2005 | Park et al. | 455/575.4 |
| 2005/0124398 A1* | 6/2005 | Lee et al. | 455/575.4 |
| 2007/0117599 A1* | 5/2007 | Kumar | 455/575.3 |

FOREIGN PATENT DOCUMENTS

WO 03/092251 11/2003

OTHER PUBLICATIONS

Competitor Slider Phones, Competitor_sliders.PPT, Apr. 15, 2004, Nokia, a total of 11 pages.

\* cited by examiner

*Primary Examiner*—Nay A Maung
*Assistant Examiner*—Angelica M Perez
(74) *Attorney, Agent, or Firm*—Squire, Sanders & Dempsey L.L.P.

(57) ABSTRACT

An electronic device comprises a first part having a first surface and a second part having a second surface confronting the first surface. The electronic device further comprises a slide module comprising a sledge part fixed on the first surface and a base part fixed on the second surface. The slide module permits a linear movement of said first part and said second part, wherein a maximum overlap of the sledge part and the base part occurs with a minimum overlap of said first part and said second part and a minimum overlap of the sledge part and the base part occurs with a maximum overlap of said first part and said second part.

19 Claims, 4 Drawing Sheets

ELECTRONIC DEVICE WITH OVERLAPPING SLEDGE PORTION

FIELD OF THE INVENTION

The invention relates to electronic devices. In particular, the present invention relates to electronic devices, such as mobile communication devices, having at least two parts, which may be made moving or sliding on or next to each other. Furthermore, the present invention relates to a slide module for such an electronic device.

BACKGROUND OF THE INVENTION

An electronic device may be provided with various different functions, such as a display, camera means, speaker means, and so on. The operation of an electronic device may be controlled by means of an appropriate user interface, such as control buttons, voice commands, touch sensitive display and so on. Furthermore, an electronic device may be provided with a processor entity and a memory means. Such electronic devices may comprise mobile communication devices or user terminals, such as user equipment (UE), a mobile station (MS), a cellular phone, a personal digital assistant (PDA) and so on, or other electronic devices, such as a laptop computer, a digital camera or a portable television.

A portable or mobile electronic device may consist of two or more different parts, which may be folded or slid next to or on each other. A possible design may have a first part, such as an engine part, and a second part, such as a display part, fixed together, but allowing a defined linear movement between the first and the second part. This design may be useful in various electronic devices, such as in portable phones. A slide construction may allow manufacturing small products. Some parts, such as control buttons or display, may be protected inside the device in a closed position. The slide construction should be able to provide linear movement when the device is opened. At the same time, mechanical strength should be maintained in both an open and closed position so as to avoid damage if, for example, accidentally dropped. Furthermore, the slide constructions should allow signal and power transfer between the different parts.

In currently proposed designs, slide rails on confronting surfaces of the different parts of the device may be used. In order to maintain a sufficient rigidity between the two or more parts of the device, the rails may extend along the length of the major parts of the device. The rails are hidden when the device is in a closed position and visible when the device is slid open. In such arrangements, a maximum overlap of the rails thus occurs when the device is closed and a minimum overlap occurs when the product is open. Spring mechanisms, such as torsion springs, providing bistable function keeping the device in the open or in the closed position may also be used. Bistable function may improve user experience compared to motion where a user feels a clear friction when opening or closing the device.

However, there is a need for providing new mechanisms for providing slide construction for electronic devices. It may be desired to take into account both a mechanical resistance as well as an appearance of the device.

SUMMARY OF THE INVENTION

In accordance with an aspect of the invention, there is provided an electronic device. The electronic device comprises a first part having a first surface. The electronic device further comprises a second part having a second surface confronting the first surface. The electronic device further comprises a slide module comprising a sledge part fixed on the first surface and a base part fixed on the second surface. The slide module permits a linear movement of said first part and said second part, wherein a maximum overlap of the sledge part and the base part occurs with a minimum overlap of said first part and said second part and a minimum overlap of the sledge part and the base part occurs with a maximum overlap of said first part and said second part.

In accordance with a further aspect of the invention, there is provided a slide module for an electronic device. The electronic device has at least two parts. The slide module comprises a sledge part fixable to a first part of the electronic device. The slide module further comprises a base part fixable to a second part of the electronic device. The slide module permits a linear movement of said first part and said second part, wherein a maximum overlap of the sledge part and the base part occurs with a minimum overlap of said first part and said second part and a minimum overlap of the sledge part and the base part occurs with a maximum overlap of said first part and said second part.

In an embodiment, the slide module may be bistable. In an embodiment, the slide module may further comprise a buckling spring for actuating said linear movement. The buckling spring may be made of a superelastic material.

In an embodiment, the first surface of the electronic device may be convex and the second surface concave compatibly to the first surface. The slide module may be curved.

In an embodiment, at least one end of the first part of the electronic device and at least an overlapping end of the second part may be provided with a support structure. In an embodiment, the support structure may comprise a locking feature integrated in a camera module integrated into one of the first and the second part of the electronic device. In an embodiment, the support structure may comprise providing at least one of the first part and the second part with a support pin and at least the other of the first part and the second part with a compatible groove. The support pin may be further provided with a spring and the compatible groove may be further provided with a magnet.

In an embodiment, the electronic device may further comprise a means for providing signal and power transfer between the first part and the second part. The means for providing signal and power transfer may comprise a flex, a micro coaxial cable bundle, an optical cable, another optical method, a capacitive method or ultra wideband (UWB) technology.

The electronic device may be a mobile communication device, a digital camera, a laptop computer or a portable television.

BRIEF DESCRIPTION OF THE DRAWINGS

The invention will now be described in further detail, by way of example only, with reference to the following examples and accompanying drawings, in which.

DETAILED DESCRIPTION OF PREFERRED EMBODIMENTS

The present invention provides a slide module for an electronic device. Furthermore, the present invention provides an electronic device comprising such a slide module, the electronic device having at least a first part and a second part. The slide module connects confronting surfaces of the first part and the second part of the electronic device.

The slide module permits a linear movement between the first and second part such that a relative movement between the first and second part is in an opposite direction to a relative movement between confronting parts of the slide module. A maximum overlap between the confronting parts of the slide module occurs when the device is in an open position and the overlap is at a minimum in a closed position. The slide module is thus hidden when the device in an open position. When the device is in a closed position, the first part and the second part of the device overlap.

In an embodiment, an indent or other support at one end or both ends of the device may be provided. This may enhance the rigidity of the device in particular in the closed position. This may also enable use of different mechanisms to trigger opening and/or closing of the device.

In an embodiment, a buckling spring provides an opening and closing mechanism, which may force and retract the parts of the device. A buckling spring, or a bending spring, may be of a superelastic material, such as an alloy of nickel and titanium called Nitinol. Use of a buckling spring may save space, such as enable a low profile of the product. A buckling spring is simple and may have an advantageous force profile for this use. In an embodiment, a torsion spring may be used as an opening and closing mechanism. Other appropriate springs may also be used.

Figure 1:
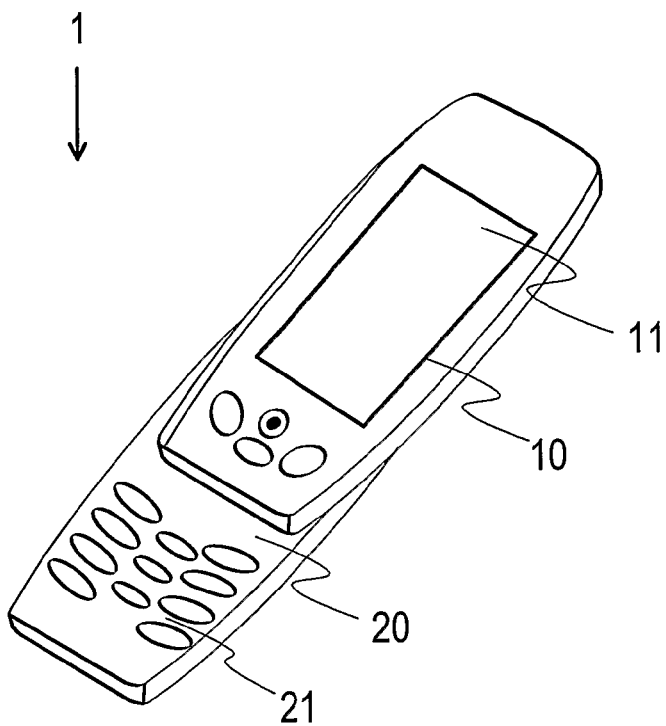
FIG. 1 shows an exemplifying electronic device in which embodiments of the invention may be implemented.

FIG. 1 shows an example of an electronic device 1 in which embodiments of the invention may be implemented. The electronic device 1 of FIG. 1 has a form of a slide design mobile station having a first part 10 and a second part 20. The first part 10 may be moved or slid on the second part 20. A display 11 is shown on the first part 10, which may also be called as a slide part or a display part. Control buttons 21 are shown on the second part 20, which may also be referred to as an immovable part or an engine part.

FIG. 1 shows only one exemplifying electronic device according to an embodiment of the invention. It shall be appreciated that the type of the electronic device may differ substantially from what is shown in FIG. 1. In FIG. 1, only two separate parts are shown. In a further embodiment, the electronic device may comprise three or more parts. A sliding module according to embodiments of the invention may be arranged in a joint between all of the parts of the electronic device or between only some of the parts. If only some of the parts are connected using the sliding module according to embodiments of the invention, the remaining connections may use other fixing mechanisms comprising, for example, other types of sliding mechanisms and folding or turning hinges.

Furthermore, the display and the control buttons shown in FIG. 1 may be located differently, replaced by other types of functions or omitted. Furthermore, a typical electronic device may further comprise a processor entity, electrical memory means, possibly an antenna element and other elements, which are not shown in FIG. 1, as they are not relevant for understanding the inventive idea. Other electronic devices according to embodiments of the invention may comprise, but are not limited to, for example devices described above in the background section and any other electronic devices having at least two parts, which may be made moving or sliding on or next to each other.

Figure 2A:
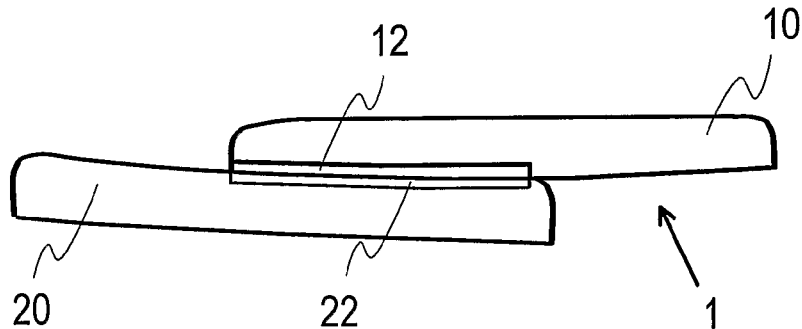
FIG. 2 shows a cross section view of an electronic device according to an embodiment of the invention.
Figure 2B:
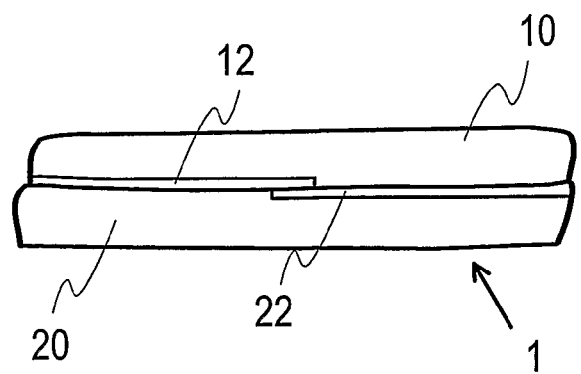

FIGS. 2a-2b show a longitudinal cross section view of the electronic device 1. On a first surface of the first part 10, a sledge part 12 of a slide module is shown. On a second surface of the second part 20, a base part 22 of the slide module is shown. The second surface confronts the first surface. The first surface and the second surface may be straight or curved surfaces. The embodiment of FIGS. 2a-2b shows curved surfaces, such as a concave surface compatible with a convex surface. The sledge part 12 and the base part 22 form together a slide module permitting a linear movement of the first part 10 and the second part 20 relative to each other. The relative movement between the first part 10 and the second part 20 is in an opposite direction to the relative movement between the confronting sledge part 12 and base part 22 of the slide module.

In FIG. 2a, the electronic device 1 is shown in an open position. It can be seen that a maximum overlap between the sledge part 12 and the base part 22 of the slide module occurs in the open position. In FIG. 2b, the electronic device 1 is shown in a closed position. It can be seen that a minimum overlap between the sledge part 12 and the base part 22 of the slide module occurs in the closed position. From FIG. 2a-2b, it can also be seen that both the sledge part 12 and the base part 22 of the slide module remain hidden on the confronting surfaces inside an assembled product so that no rails or grooves are visible, both in the open position and the closed position.

Figure 3A:
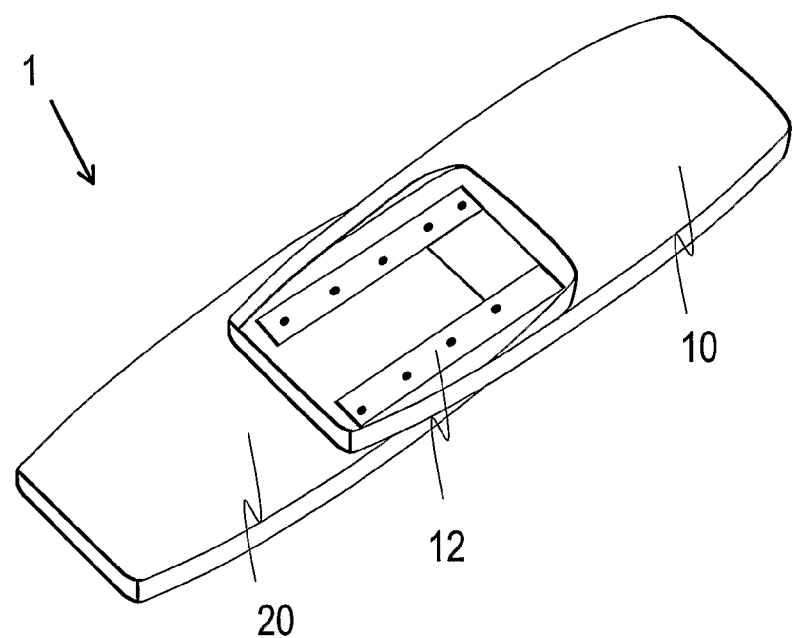
FIG. 3 shows a transparent view of an electronic device according to an embodiment of the invention.
Figure 3B:
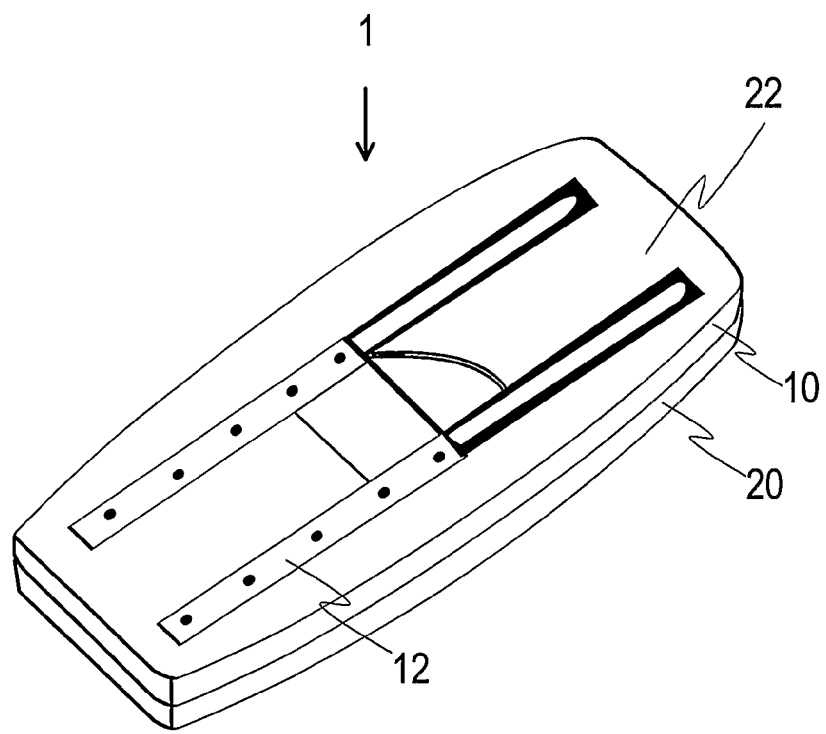

FIGS. 3a-3b show a transparent view of the electronic device 1. In FIGS. 3a-3b, the slide module comprising the sledge 12 and the base part 22 is made visible through the transparent parts of the device. FIG. 3a shows the electronic device 1 in the open position and FIG. 3b in the closed position. As in FIGS. 2a-2b, it can be seen also in FIGS. 3a-3b that a maximum overlap between the sledge part 12 and the base part 22 of the slide module occurs in the open position and a minimum overlap occurs in the closed position.

Figure 4A:
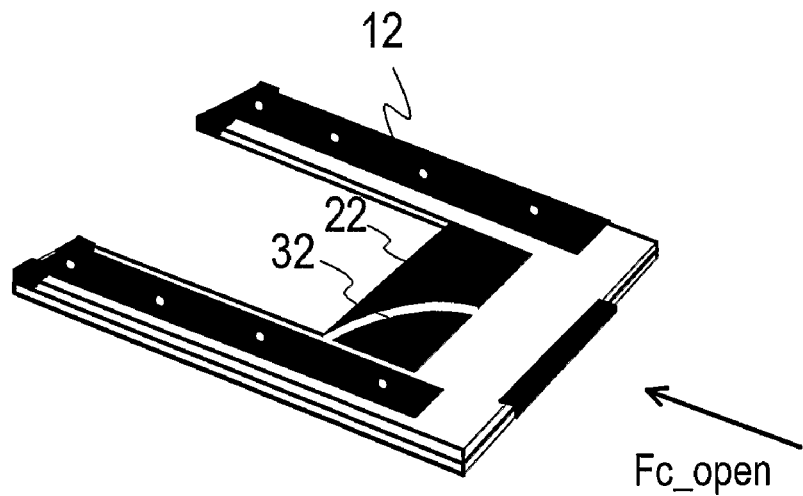
FIG. 4 shows an embodiment of the invention.
Figure 4B:
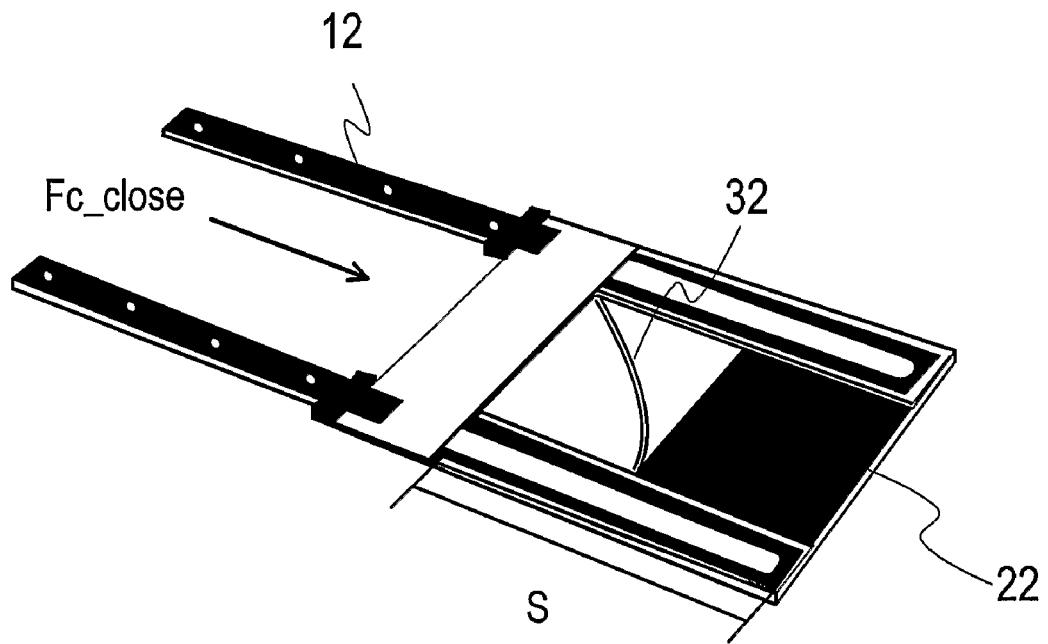

FIGS. 4a-4b show a slide module according to an embodiment of the invention. The slide module comprises the sledge part 12, which may be fixed to the first part 10 of the electronic device 1, and the base part 22, which may be fixed to the second part 20 of the electronic device 1. In FIG. 4a, the slide module is shown in a position corresponding to the open position of the electronic device. In FIG. 4b, the slide module is shown in a position corresponding to the closed position of the electronic device. As in FIGS. 2a-2b and FIGS. 3a-3b, it can be seen also in FIGS. 4a-4b that a maximum overlap between the sledge part 12 and the base part 22 of the slide module occurs in the open position of the electronic device and a minimum overlap occurs in the closed position of the electronic device.

The slide module shown in FIGS. 4a-4b may be used for straight and curved slide motion and may thus connect straight surfaces or curved surfaces in embodiments of the invention. A sliding length S is a distance that the sledge part 12 is able to move compared to the base part between the closed and the open position.

Movement of the slide module is preferably bistable. The slide module preferably has catching forces $F_{C\_Open}$, $F_{C\_Close}$ at open and close positions, respectively. The catching force a minimum force that is required for moving the sledge 12 from end positions. Catching forces at open and closed position may be similar or different, for example depending on fixing points of the used spring. In an embodiment, bistable function may be obtained using at least one buckling spring 32 to force and retract the parts of the device, as shown in FIG. 4a-4b. In an embodiment, two buckling springs are used. In other embodiments, the used spring may be a torsion spring or another appropriate spring.

A buckling point may be about in the middle of the sliding length. The buckling point is the point in which the direction of spring force is perpendicular to the sliding axis and where a push force changes to pull force and vice versa. In an area of buckling point, spring force is not able to cause the sliding movement. The slide module does not continue to slide if movement is stopped in the area of the buckling point. Length of the area of the buckling point may depend on friction between the sledge part 12 and the base part 22. The friction between the sledge part 12 and the base part 22, and thus the length of the area of the buckling point, is preferably as small as possible.

In an embodiment, the sliding length S of the slide module may be, for example 34 mm, which may be a suitable sliding length for example for a slide phone. The surfaces may have a rotation radius of infinite (straight) to 400 mm or even smaller. In this embodiment, a buckling spring may be used and the catching force $F_{C\_Open}$, $F_{C\_Close}$ may be, for example, about 4 N.

Figure 5:
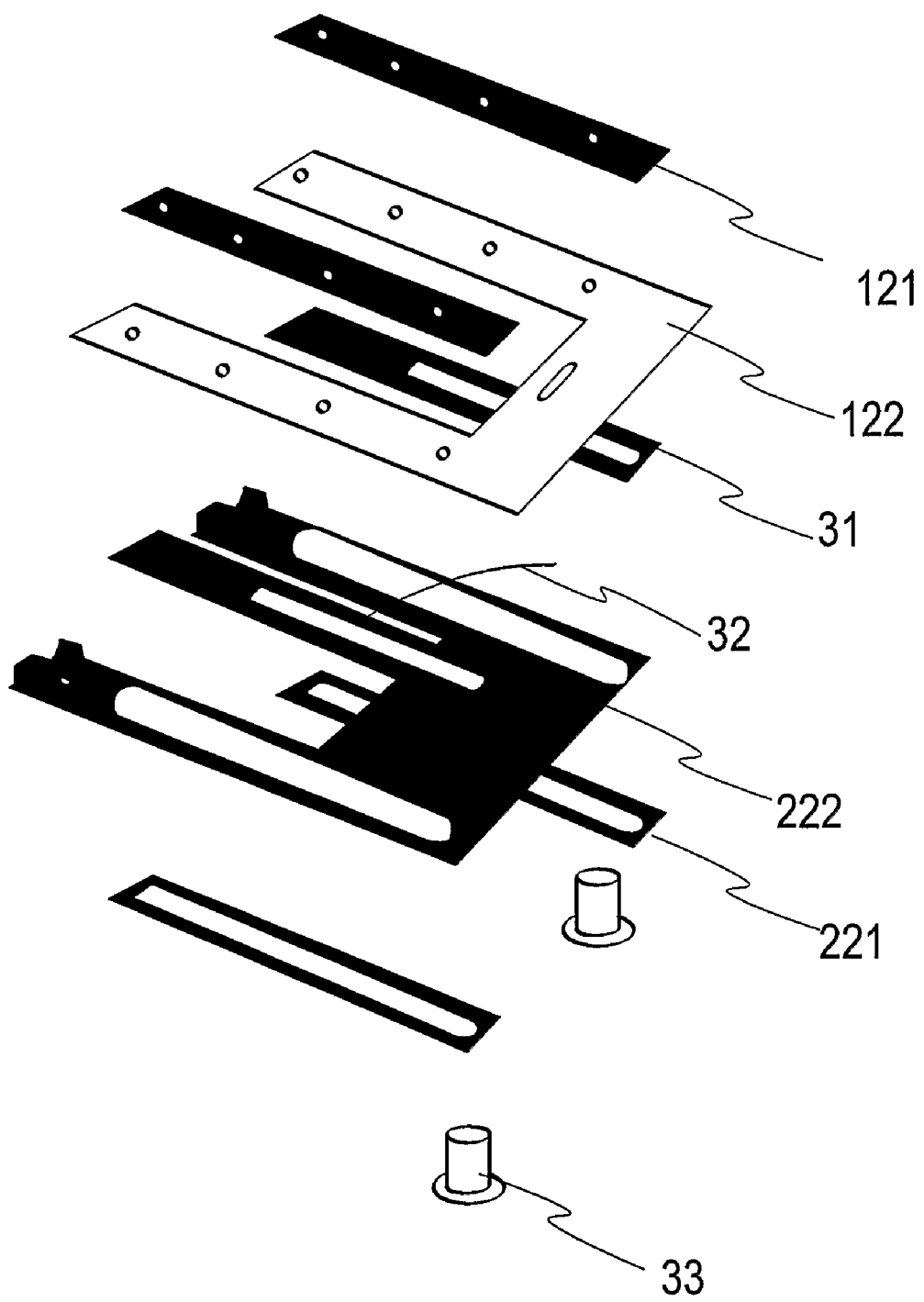
FIG. 5 shows an exploded view of an embodiment of the invention.

FIG. 5 shows an exploded view of the slide module of FIGS. 4a-4b. The sledge part 12 may comprise sledge slide strips 121 and a sledge 122 to be fixed to the first part 10 of the electronic device 1. Slide bars 31 may act as bearing elements between the sledge part 12 and the base part 22. A spring 32 may be used to support and/or cause the sliding movement of the sledge part 12 relative to the base part 22. The base part 22 may comprise a base 222 to be fixed to the second part 20 of the electronic device 1 and base slide strips 221. Slide pins 33 may be included for providing a guide means for guiding the linear movement of the slide module.

In an embodiment, some of the elements of the slide module shown in FIG. 5 may be integrated. For example, the base 222, the base slide strips 221 and the slide bars 31 may be integrated into a single element. Another example may comprise integrating the sledge 122 and the sledge slide strips 121 into a single element.

In an embodiment, the sledge 122 and the base 222 may be made of sheet metal, such as stainless steel. For slide strips 121, 221 ultra high molecular weight polyethylene (UHMW-PE) may provide a suitable material. For slide bars 31, a preferable material has good sliding properties and durability; for example polyacetal-acetalplastic (POM) may provide a suitable material. A buckling spring made of a superelastic material or a shape memory material, such as an alloy of nickel and titanium called Nitinol, may be advantageously used as the spring 32. In an embodiment, if a torsion spring is used, the spring may be made of a convential spring steel.

In an embodiment, additional support may be used for improving drop durability, in particular in a closed position, where the support distance of the slide module is shortest. In an embodiment, a locking feature may be implemented at one or both ends of the electronic device. In an embodiment, a locking feature may be integrated in a camera module, for example, thereby providing a hidden support mechanism. The camera module may be integrated into one of the first and the second part of the electronic device. In an embodiment, an indent on one of the confronting surfaces and a lip on the other confronting surface may provide a locking feature that will mate when the device is closed, but can be easily detached when the two parts are slid into the open position.

In a further embodiment, one of the first part and the second part may be provided with a support pin and the other of the first part and the second part may be provided with compatible groove. In an embodiment, the pin may be provided with a spring and the groove preferably with a magnet Depending on the location of the groove, this embodiment may provide support in all directions.

In a further embodiment, a fixed pin may be arranged on one of the first part and the second part and a long, compatible groove may be arranged in the other of the first part and the second part. Depending on cross-sectional designs of the fixed pin and the groove, as well as the length of the groove, this embodiment may increase durability both in the closed and the open position.

A connection for signal and power transfer between the different parts 10, 20 may be implemented using a flex or a micro coaxial cable bundle and/or other appropriate means, such as an optical cable and other optical methods, capacitive methods, ultra wideband (UWB) technology, and so on. The flex or the cable may go over a front corner of the first part or through an opening in the first part. Edges of the corner or the opening are preferably smooth and rounded to avoid damaging the flex or the cable.

Although the invention has been described in the context of particular embodiments, various modifications are possible without departing from the scope and spirit of the invention as defined by the appended claims. It should be appreciated that whilst embodiments of the present invention have mainly been described in relation to mobile communication devices, embodiments of the present invention may be applicable to other types of electronic devices comprising at least two parts, which may be made sliding or moving on or next to each other. Examples of such other types of devices may comprise digital cameras, laptops and so on.

The invention claimed is:

1. An electronic device comprising:
a first part having a first surface;
a second part having a second surface confronting the first surface; and
a slide module comprising a sledge part fixed on the first surface and a base part fixed on the second surface;
wherein the slide module permits a linear movement of said first part and said second part, wherein a maximum overlap of the sledge part and the base part occurs with a minimum overlap of said first part and said second part and a minimum overlap of the sledge part and the base part occurs with a maximum overlap of said first part and said second part.

2. The electronic device according to claim 1, wherein the slide module is bistable.

3. The electronic device according to claim 1, the slide module further comprising a buckling spring for actuating said linear movement.

4. The electronic device according to claim 3, wherein the buckling spring is made of a superelastic material.

5. The electronic device according to claim 1, wherein the first surface is convex and the second surface is concave compatibly to the first surface.

6. The electronic device according to claim 5, wherein the slide module is curved.

7. The electronic device according to claim 1, wherein at least one end of the first part and at least an overlapping end of the second part is provided with a support structure.

8. The electronic device according to claim 7, wherein the support structure comprises a locking feature integrated in a camera module integrated into one of the first and the second part of the electronic device.

9. The electronic device according to claim 7, wherein the support structure comprises providing at least one of the first part and the second part with a support pin and at least the other of the first part and the second part with a compatible groove.

10. The electronic device according to claim 9, wherein the support pin is further provided with a spring.

11. The electronic device according to claim 9, wherein the compatible groove is further provided with a magnet.

12. The electronic device according to claim 1, further comprising a means for providing signal and power transfer between the first part and the second part.

13. The electronic device according to claim 12, wherein the means for providing signal and power transfer comprises at least one of a flex, a micro coaxial cable bundle, an optical cable, another optical method, a capacitive method and ultra wideband (UWB) technology.

14. The electronic device according to claim 1, comprising one of a mobile communication device, a digital camera, a laptop computer and a portable television.

15. A slide module for an electronic device, the electronic device having at least two parts, the slide module comprising:

a sledge part fixable to a first part of the electronic device; and
a base part fixable to a second part of the electronic device;
wherein the slide module permits a linear movement of said first part and said second part, wherein a maximum overlap of the sledge part and the base part occurs with a minimum overlap of said first part and said second part and a minimum overlap of the sledge part and the base part occurs with a maximum overlap of said first part and said second part.

16. The slide module according to claim 15, wherein the slide module is bistable.

17. The slide module according to claim 15, further comprising a buckling spring for actuating said linear movement.

18. The slide module according to claim 17, wherein the buckling spring is made of a superelastic material.

19. The slide module according to claim 15, wherein the slide module is curved.

* * * * *